United States Patent
Olley et al.

(10) Patent No.: US 7,588,814 B2
(45) Date of Patent: Sep. 15, 2009

(54) CONSOLE OR TRIM SKIN FOR LARGE VOLUMES USING A SINGLE PRE-FORMED (FORMED OR MOLDED) SINGLE SKIN

(76) Inventors: Peter Anthony Olley, 101 Mashiters Walk, Romford, Essex (GB); Ian Sutherland Wright, 17 St. Fabians Drive, Chelmsford, Essex, CMI 2PR (GB)

( * ) Notice: Subject to any disclaimer, the term of this patent is extended or adjusted under 35 U.S.C. 154(b) by 169 days.

(21) Appl. No.: 11/335,116

(22) Filed: Jan. 19, 2006

(65) Prior Publication Data
US 2007/0014969 A1    Jan. 18, 2007

(30) Foreign Application Priority Data
Jan. 19, 2005    (FR)  .................................. 05 00534

(51) Int. Cl.
*B32B 3/30*    (2006.01)
(52) U.S. Cl. .................. 428/102; 428/156; 428/163
(58) Field of Classification Search .................. 428/57, 428/58, 102, 151, 156, 163, 36.9
See application file for complete search history.

(56) References Cited

U.S. PATENT DOCUMENTS

| | | | | |
|---|---|---|---|---|
| 2,546,553 A | * | 3/1951 | Majtner | 12/67 B |
| 3,847,699 A | * | 11/1974 | Shaw et al. | 156/251 |
| 4,494,266 A | * | 1/1985 | Bartneck | 12/142 RS |
| 6,655,711 B1 | * | 12/2003 | Labrie et al. | 280/728.3 |
| 2003/0150341 A1 | * | 8/2003 | Ciaramitaro et al. | 101/129 |
| 2003/0168151 A1 | | 9/2003 | Wright et al. | |

FOREIGN PATENT DOCUMENTS

| | | |
|---|---|---|
| DE | 39 24 254 A1 | 2/1990 |
| DE | 04 17 173 A1 | 12/1990 |
| DE | 04 17 173 A1 | 12/1991 |
| DE | 20 2004 003 134 U1 | 6/2004 |
| DE | 20 2004 003 134 U1 | 7/2004 |
| FR | 2 901 285 A1 | 5/2006 |
| FR | 2 901 285 A1 | 11/2007 |
| JP | 04 144 715 | 5/1992 |

OTHER PUBLICATIONS

Office Action from German Patent Office May 2009.

* cited by examiner

*Primary Examiner*—Alexander Thomas
(74) *Attorney, Agent, or Firm*—Brinks Hofer Gilson & Lione

(57) ABSTRACT

A panel, in particular a covering panel or vehicle lining, is provided with a one-piece skin having, in the region of its exposed surface, at least one visual feature with a linear structure imitating or simulating a functional construction, such as a sewing operation. This skin is mounted on a substrate forming the panel body without significant intentional deformation of said preformed skin.

8 Claims, 3 Drawing Sheets

CONSOLE OR TRIM SKIN FOR LARGE VOLUMES USING A SINGLE PRE-FORMED (FORMED OR MOLDED) SINGLE SKIN

BACKGROUND

1. Field of the Invention

The present invention relates to the production of articles of the type that comprise of composite planar or non-planar panels or covering elements, in particular console panels, instrument panels or vehicle interior trim panels, and it concerns a method for producing such a panel, as well as a panel obtained by this method.

2. Related Technology

The type of panels that the present invention relates to generally comprise a substrate forming a panel body, generally of a foamed plastics material or a molded thermoplastics material to which a surface skin or the like, having a substantially decorative function (of a synthetic material having the desired appearance), is attached.

The conventional method for producing such a panel consists in producing, by forming (by heating and suction for example) or by slush casting, an integral skin or cover and mounting it on a substrate or placing it with such a substrate into a mold for molding by foaming to produce the finished panel.

In various applications, in particular vehicle interiors, a visual appearance is sought which gives the impression of a traditional production method and an exposed hand-sewn seam.

The current method for producing such a panel having a predetermined aesthetic appearance consists, first of all, in producing a substrate (by molding, forming or the like) the surface of which substantially has the configuration of the exposed surface to be obtained and which corresponds thereto absent the thickness of the decorative skin to be attached. A plurality of skin parts or decorative covering covers is simultaneously provided by separate production. These parts are assembled by sewing to form the skin or cover. The reconstituted skin or cover is then placed onto the face in question of the panel body and attached thereto. It is necessary for the skin to stretch to a certain extent to obtain the desired appearance. This makes the method awkward to carry out and does not allow seams to be placed near openings, flaps or edges of the panel. The skin may be attached to the substrate, as mentioned previously, in various ways such as gluing, welding or attachment by a layer of foaming material (which makes the surface of the panel less rigid and softer to touch).

The applicant's document U.S. Patent Application Publication No. 2003/0168151 A1, which is herein incorporated by reference, discloses a method in which a plurality of preformed pieces of skin, intended to form the basis of a given decorative skin, are produced (by forming or molding). These pieces are then assembled to form the decorative skin, the front faces of the seams are sealed and the skin is then mounted on a substrate forming the panel body by one of the joining methods described hereinbefore. FIG. 1 of the accompanying drawings is a partial and schematic view of a panel section obtained by this method, the section being in the region of an assembly seam.

By this improved method, it is possible to produce panels having exposed seams or decorative, simulated stitching and to produce panels without such stitching using the same facilities and the same method. Generally, functional stitching secures two skin portions together and is reinforced with seam tape or a similar material. Simulated stitching may be positioned on opposite sides of the juncture. The shape, number and arrangement of seam lines may be changed without requiring major modifications to the tools (for example, when producing a new model). Finally, since no stretching of the skin is required, it is possible to optionally position the seam lines relatively close to the openings, edges, flaps or similar discontinuities.

However, this method still requires actual seaming operations (rarely automated), which are tiresome, expensive, cannot guarantee extensive standardization and generate a relatively large amount of waste.

SUMMARY

The object of the present invention is to overcome the aforementioned drawbacks, while still presenting the advantages of the improved method described hereinbefore.

The principal object of the present invention is to provide a method for producing a panel, in particular a covering panel or interior vehicle trim, provided with a surface skin or decorative cover. An integral preformed skin or cover is produced by molding or forming and includes, in the region of its exposed surface, at least one visual feature having a linear structure imitating or simulating a functional constructional or manufacturing line or the sketch of such a line. This preformed skin or the like is mounted on a substrate forming the body of the panel by gluing, welding, producing an intermediate cellular bonding layer, in situ foaming of the material forming the patent body or the like, without intentional deformation of the preformed skin or cover.

BRIEF DESCRIPTION OF THE DRAWINGS

The invention will be better understood as a result of the following description, which relates to preferred embodiments, given by way of non-limiting examples, and explained with reference to the accompanying schematic drawings, in which.

DETAILED DESCRIPTION

Figure 1:
FIG. 1 is a schematic illustration of a known prior construction technique for a seam assembly.

The construction for producing a composite panel 1 according to the invention generally includes producing an integral preformed skin or cover 2 by molding or forming. The skin 2 includes, in the region of its exposed surface, at least one visual feature 3 having a linear structure imitating or simulating a functional constructional or manufacturing line, or the appearance of such a line. This preformed skin 2 is mounted on a substrate 4 forming the body of the panel, by gluing, welding, producing an intermediate cellular bonding layer 4', in situ foaming of the material forming the panel body or the like, without significant intentional deformation of said preformed skin 2.

By forming the skin 2 all in one piece and in a preformed manner, actual assembly operation(s) via sewing are eliminated, the structural integrity is preserved (absence of an assembly interface and discontinuity) and no deformation or stretching is required when this skin 2 is applied to the substrate 4.

Figure 2A:
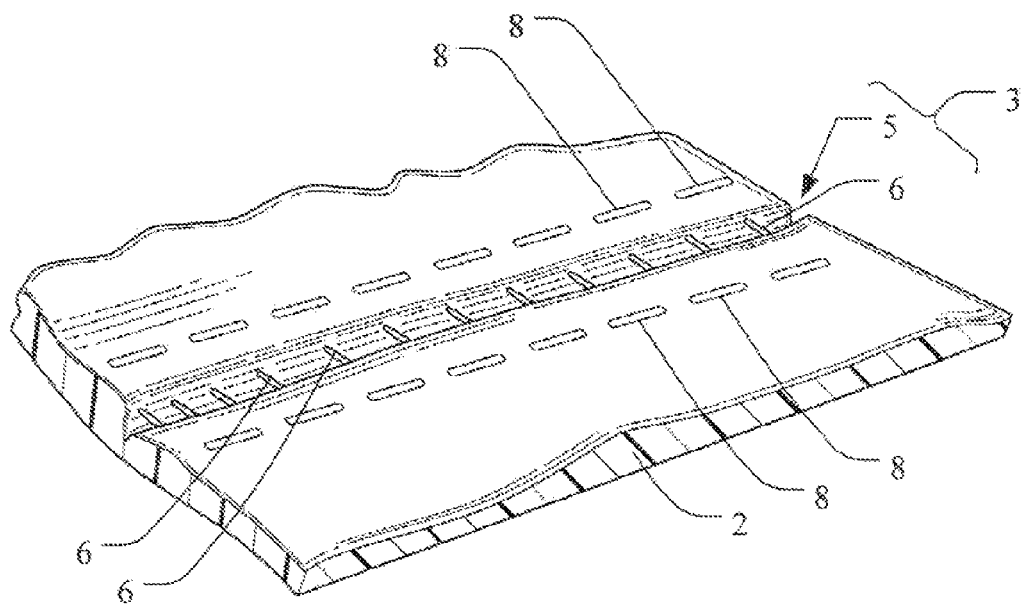
FIGS. 2A-C and 3A-C are perspective, sectional and plan views of two variations of a first embodiment of the invention immediately after molding or forming of the skin and before attaching the skin to the panel body.
Figure 2B:
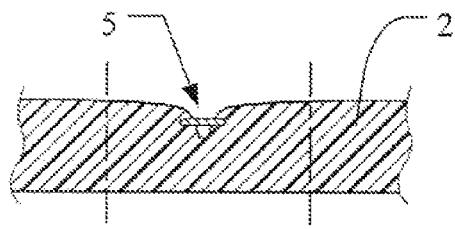
Figure 2C:
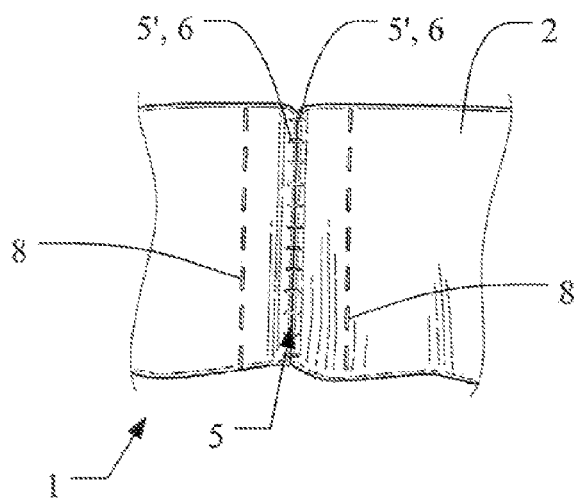

According to a first embodiment shown in FIGS. 2 (first variant) and 3 (second variant) of the accompanying drawings, at least one or each visual feature 3 is produced by molding or forming and includes a principal protruding (FIGS. 3A-C) or recessed (FIGS. 2A-C) linear formation 5, i.e. a slot, groove, rib, edge or fold. The linear formation 5 includes a plurality of secondary formations 6 imitating assembly seam or stitch points. These secondary formations 6 may extend perpendicular or at an angle to the longitudinal direction of the principal formation 5. Manufactured in this manner, the desired final visual feature 3 is immediately present after the molding or forming of the skin 2.

As seen in FIGS. 2A-2C, this visual feature 3 may, for example, be a slot 5 with material bridges 6 simulating an assembly stitch. The visual feature thus resembles a seam between two pieces of skin 2.

Figure 3B:
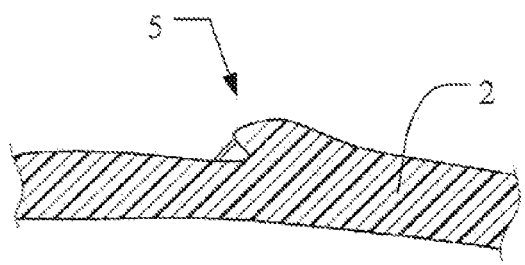
Figure 3C:
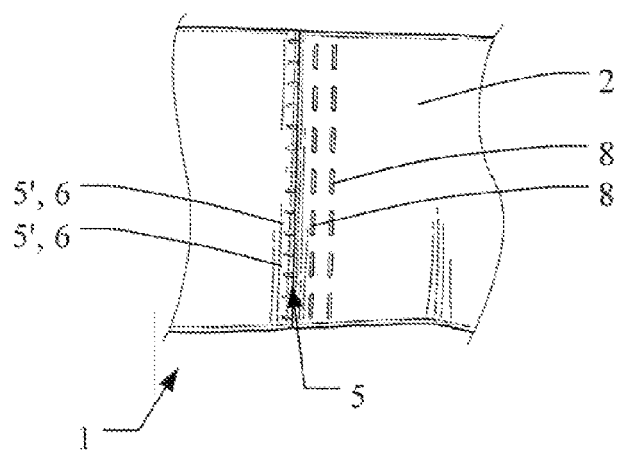
Figure 3A:
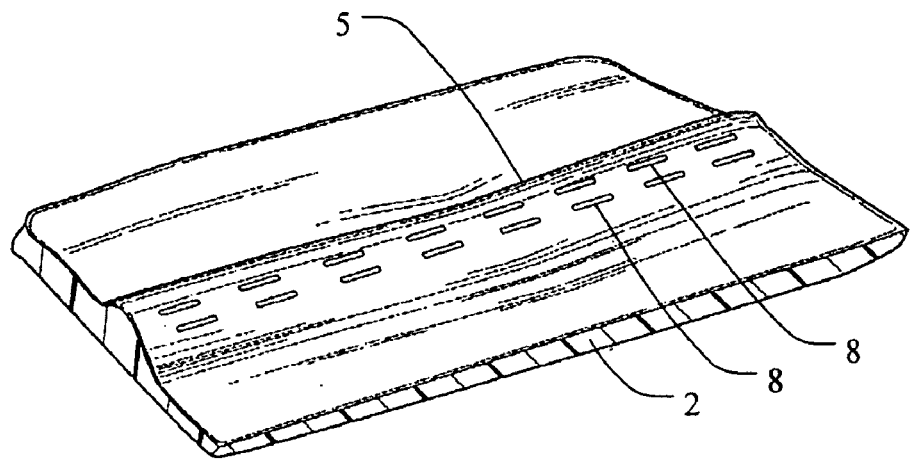

As seen in FIGS. 3A-3C, this visual feature 3 may be in the form of an excessive build-up 5 simulating a fold and limiting of the partial overlap of two pieces of skin, with or without an associated assembly with a seam line imitation 6.

Possibly, the formation 5 also includes needle marks or traces 5' further visually forming the sketch of an assembly stitch or seam line. The secondary formations 6 and/or the needle marks or traces 5' may be produced, by way of non-limiting example, by using heat and with the skin 2 under pressure. This operation may be carried out separately or be incorporated in the sewing operation.

It is further possible to provide one or more decorative seam or stitch line 8, by molding or forming, on opposite or a single side of the visual feature 3. In an advantageous manner, it may also be envisaged to carry out the operations for forming the false assembly seam 5', 6 in the region of the formation 5, simultaneously to the production of the additional decorative seam line or lines 8.

Figure 4:
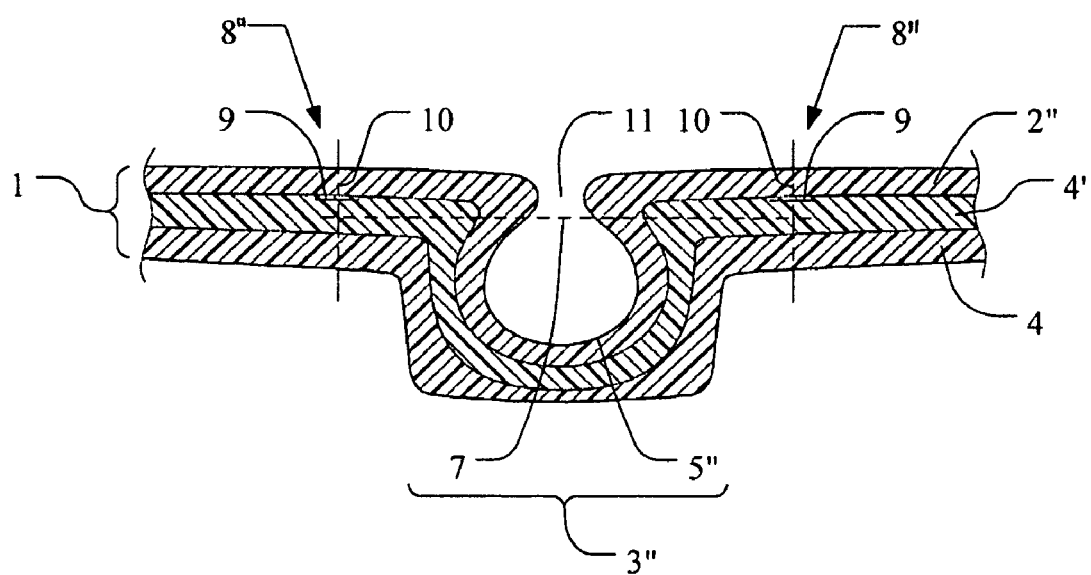
FIG. 4 is a detailed sectional view of a first variation of a second embodiment of the invention.

According to a second embodiment seen in FIG. 4, the skin 2" has at least one or each visual feature 3" defining a protruding or recessed linear formation 5", formed by molding or obtained by forming, i.e. a slot, groove, rib, edge or fold. This formation 5", however is subjected to a subsequent operation, for example actual sewing, stitching or notching, so as to produce, in the region of this formation 5", secondary formations, a non-functional stitch or seam line, 7 extending perpendicularly or at an angle to the longitudinal direction of the principal formation 5". Notably, non-functional stitch or seam line 7 is produced during an actual subsequent stitching or sewing operation, subsequent to molding but before attachment of the skin 2" to the body 4 or in situ formation thereof. Since the skin 2" is one piece, secondary formations 7 only imitate an assembly seam or stitch points.

As shown in FIG. 4 of the accompanying drawings, the method may also include in producing, during one or more stitching or sewing operation(s) carried out before attaching the skin 2" to the panel body 4, at least one additional decorative stitch or seam line 8" extending along at least one side of the visual feature 3" or the formation 5" and having a linear structure.

In order to preserve the water tightness of the skin 2", the method may also consist, before attaching the skin 2" to the panel body 4, applying a sealant 9, in a continuous or discontinuous manner, to the unexposed face of the skin 2" in the region of a through-hole 10 formed by the needle or the needles used in providing the decorative stitch or seam line(s) 8. Nonetheless, due to the absence of an assembly interface and structural discontinuity in the single-piece skin 2, only localized applications of strips, liquid substance or similar sealing products is necessary.

Via the above construction, the present invention provides a structural panel 1 for covering or lining a vehicle, in particular an interior door panel, a panel forming a flap or console part, an instrument panel or passenger compartment panel, provided with a decorative skin 2" on the surface.

According to the invention, this panel 1 is characterized in that it comprises a substrate forming the panel body 4 on which the skin 2, that is preformed in one piece, is mounted. In the region of its exposed face is at least one visual feature 3 having a linear structure 5 imitating or simulating a functional constructional or manufacturing line. The visual feature 3 consists at least partially of a formation or formations 5, 6 formed by molding. The or each visual feature 3 comprises, on the one hand, a principal formation 5 formed by molding or produced by forming and chosen from the group including slots, grooves, edges, ribs or folds, having a rectilinear or non-rectilinear extension, and, on the other hand, a plurality of secondary formations 6, also formed by molding or produced by forming, and possibly completed by a false assembly marks 5' and decorative stitches 8.

This panel 1 would preferably be obtained by means of the method described above.

In an alternative embodiment, illustrated in FIG. 4, the visual feature 3" comprises of a slot 5" having a triangular or tubular cross section, opened on the exposed face by an aperture 11 and across which actual decorative stitch or seam points 6", extend transversely at regular intervals. These stitch or seam points 6" may be partially exposed through the aperture 11.

With this invention, it is also possible, in particular, to provide an additional non-functional stitch line produced during an actual sewing operation before attaching the skin to the body of the panel.

The invention is, of course, not limited to the embodiments described and illustrated in the accompanying drawings. Modifications are possible, in particular as regards the constitution of the various elements or by substitution of technical equivalents, without thereby departing from the scope of the invention.

The invention claimed is:

1. A structural panel for covering or lining at least part of a component including an interior door panel, an instrument panel, a console or flap in a passenger compartment of a vehicle, the panel comprising:
   a substrate;
   a preformed, one piece skin mounted to the substrate, the skin being formed by molding and defining an exposed face, at least one visual feature simulating a functional constructional being formed on the exposed face, the visual feature including a principal formation in the form of a recessed linear structure formed by molding, and a secondary formation in the form of a false stitch laterally transversing the recessed linear structure and being formed as stitching extending through the skin.

2. The panel according to claim 1 wherein the principal formation is one chosen from the group including slots, grooves, edges, ribs and folds.

3. The panel according to claim 1 wherein the secondary feature is formed as a molded feature.

4. The panel according to claim 1 wherein the secondary feature is provided within the principal feature.

5. The panel according to claim 1 further comprising a simulated decorative stitch located adjacent to the visual feature.

6. The panel according to claim 5 wherein the simulated decorative is formed as a molded decorative stitch in the surface of the skin.

7. A structural panel for covering or lining at least part of a component including an interior door panel, an instrument panel, a console or flap in a passenger compartment of a vehicle, the panel comprising:
   a substrate;
   a preformed, one piece skin mounted to the substrate, the skin being formed by molding and including on an exposed face thereof at least one visual feature simulating a functional constructional, the visual feature including a principal formation in the form of a linear structure formed by molding, and a secondary formation in the form of a false stitch laterally transversing the linear structure, wherein the linear structure includes a slot having generally tubular cross section with an aperture toward the exposed face, the secondary feature bridging the aperture and extend transversely at regular intervals, the secondary feature being partially exposed through the aperture.

8. The panel according to claim 7 wherein the secondary feature is formed as stitching extending through the skin.

* * * * *

UNITED STATES PATENT AND TRADEMARK OFFICE
CERTIFICATE OF CORRECTION

PATENT NO. : 7,588,814 B2  Page 1 of 1
APPLICATION NO. : 11/335116
DATED : September 15, 2009
INVENTOR(S) : Peter Anthony Olley et al.

It is certified that error appears in the above-identified patent and that said Letters Patent is hereby corrected as shown below:

In the Claims

In column 4, claim 6, line 66, before "is formed as a molded" insert --stitch--.

Signed and Sealed this

Twenty-second Day of December, 2009

David J. Kappos
*Director of the United States Patent and Trademark Office*